Patented Apr. 10, 1923.

1,451,092

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CUMARON PAINT.

No Drawing.    Application filed January 4, 1919. Serial No. 269,664.

*To all whom it may concern:*

Be it known that I, CARLETON ELLIS, a citizen of the United States, and a resident of Montclair, in the county of Essex and State of New Jersey, have invented certain new and useful Improvements in Cumaron Paint, of which the following is a specification.

This invention relates to a paint prepared from various pigments and a vehicle containing cumaron resin and the object of the invention is to produce a composition which will be quick drying and in the preferred form one which will dry to a flat or dull surface, free from the glossiness or shininess of ordinary paint.

For this purpose I may proceed in the following illustrative manner: 1 pound of hard cumaron resin (melting point about 90° C.) is heated and thinned with between 1½ and 2 pounds of heavy benzine or mixtures of benzine and aromatic hydrocarbons. Such solutions as here described would contain from about 33 to 46% of the resin. This solution may then be mixed with 5 pounds of lithopone and put through a paint grinder. When this is painted on a wooden or other surface it dries to a flat finish. For a red color, iron oxide may be used such for example as a mineral red. Suitable proportions are the following:—

225 pounds of mineral red, 57 pounds of cumaron resin and 80 pounds of heavy benzine.

For other colors various pigments may be employed such as ochre, umber, Brunswick green, slate colors and the like. For white paints in addition to lithopone, pigment such as white lead, zinc oxide, or zinc white, zinc sulfid and the like may be used and there may be admixed with these such filling and extending materials as barytes, whiting, china clay, silex or silica, ground asbestos, etc. Basic pigments may be used satisfactorily with the cumaron resin vehicle.

Preferably the composition is made up without the use of any drying oil although it is not necessarily limited to a vehicle containing simple cumaron resin and a solvent or in other words the addition of small amounts of oils or other resins may be employed if desired. Linseed oil, however, has a tendency to slow down the rate of drying and wood oil has an odor which is objectionable for interior work. One object of an embodiment of my invention is to produce a paint which can be applied to wall plaster or other surfaces to produce a flat water-proof finish. The hard cumaron resin preferably employed has no undesirable odor and the benzol, turpentine, heavy benzine or other volatile solvent preferably employed as a thinning agent evaporates readily producing a quick drying product yielding the desired flat finish free from bad odor.

I do not limit myself to any special solvent vehicle but prefer the heavy grade of benzine also varnish painters' naphtha and the like. The cumaron resin may be admixed with some acid resin if desired, especially if a neutralizing effect is desired on lime or cement surfaces. For example a mixture of 80 to 90 parts of cumaron resin with 10 to 20 parts of ordinary resin, or various grades of copal resin such as Manilla or kauri may be employed. In using a basic pigment such as zinc oxide there is danger from livering if the resinous base is of too high an acid nature and I preferably employ the pure cumaron resin free from acid bodies in such cases.

Attention is called to the relatively large proportion of pigment to the resinous binder it being a desirable or preferred feature of the present invention to employ such proportion substantially as indicated herein.

Another formula for a flat drying paint is lithopone 145 pounds, resin 50 pounds, thinner 80 pounds. A paint with a low gloss is made from lithopone 135 pounds, resin 50 pounds and thinner 70 pounds. A glossy paint is derived from lithopone 135 pounds, resin 50 pounds, and thinner about 60 lbs.

To recapitulate, the present invention relates to a paint prepared from various pigments and a vehicle containing cumaron resin dissolved in a solvent, preferably without addition of drying oils and preferably without driers of any kind, and also relates to the process of making cumaron resin paint which comprises dissolving cumaron resin, especially a fairly hard resin of melting point 90 or so in a vehicle such as a hydrocarbon solvent and especially vehicles made from mixtures of hydrocarbons particularly those of the paraffin and aromatic series, as for example, benzine or painters' naphtha admixed with an aromatic hydrocarbon such as benzol, toluol, xylol or the solvent naphthas; and the process further embraces the method of making a solution of cumaron resin in a simple solvent or composite solvent material by permitting the resin to dissolve in the cold to yield a solution which preferably is brought approximately to the saturation point and in employing such substantially saturated solution as the basis of the vehicle for the paint composition hereunder. The invention further embraces the production of paints capable of drying to a dull or flat finish and involves the compounding of pigment, resin and thinner in proportions to give such dull or matt effects. The invention comprises the use of the various forms of cumaron resin or paracumaron in its different commercial embodiments but preferably as stated calls for the use of a hard resin which when put into solution in a thinner in which it forms a compatible or substantially non-colloidal solution and dries quickly without forming any objectionable tacky surface. Thus solvents of a mixed character such as gasoline and toluol or benzine and turpentine in various proportions (e. g. 9:1) may be employed advantageously.

The solubility of cumaron resin in different solvents varies greatly. It is readily soluble in benzol in the cold and remarkably soluble in toluol. The solubility in solvent naphtha is somewhat less. As a rule for the harder varieties of paracumaron in the hydrocarbons of the paraffin series the solubility is less pronounced. In heavy benzine the hard resin dissolves but slightly in the cold and only by melting the resin and thinning with benzine is it possible to obtain a solution of any satisfactory degree of concentration. In this case of course a supersaturated solution is likely to be obtained which would deposit solid matter on standing for a long time. In a similar manner varnish painters' naphtha and ordinary gasoline (both composed essentially of hydrocarbons of the aliphatic series) are relatively poor solvents in comparison with some of the hydrocarbons of the aromatic series. When a hydrocarbon of the former series is mixed with a relatively small proportion of a hydrocarbon of the latter group the solubility is increased seemingly beyond the expected solvent effect. Accordingly solutions may be prepared in the cold from such composite solvents which contain only that amount of resin which will remain in solution under normal climatic conditions of keeping of paint products. Hence the procedure enables the production of mixtures of paint which will keep indefinitely. Once the solubility of the particular grade of resin employed in the particular composite solvent used is ascertained it is not necessary in all cases to dissolve the resin in the cold. If desired the amount of resin required to produce a substantially saturated solution may be melted and thinned with the solvent material if desired. On the other hand if the resin contains substances such as sulphonic acids which are insoluble in the gasoline or the hydrocarbon solvent or mixtures of solvents which go into solution on heating, melting and thinning to form an unstable solution from which solid matter may precipitate gradually on standing over a long period of time it is better to make the solution in the cold and then if necessary filter from any undissolved matter in case the amount of sediment is objectionable as may be the case with some hydrocarbon products of the paraffin series especially when no benzol, toluol, turpentine, pine oil and the like is present.

What I claim is:—

1. In the process of making a vehicle suitable for paint or other purposes the step which comprises dissolving cumaron resin in the cold in a solvent consisting of gasoline and an aromatic hydrocarbon including toluol to produce a solution which is substantially saturated at normal or room temperature and which is substantially free from deposits of solid matter on keeping.

2. In the process of making a vehicle suitable for paint or other purposes the step which comprises dissolving cumaron resin in the cold in a solvent consisting of gasoline and toluol to produce a solution which is substantially saturated at normal or room temperature.

3. A paint comprising a pigment, cumaron resin and a solvent therefor, said solvent consisting of gasoline and toluol in the ratio of about 9 parts of the former to 1 part of the latter.

4. A paint comprising a pigment, cumaron resin of melting point about 90° C., a paraffin hydrocarbon solvent and a liquid aromatic hydrocarbon.

CARLETON ELLIS.